United States Patent Office 3,644,531
Patented Feb. 22, 1972

3,644,531
2-PROPYNYLSULFONIUM SALTS
Yukichi Kishida, Atsusuke Terada, Hiromu Takagi, and Toshiharu Kamioka, Tokyo, Japan, assignors to Sankyo Company Limited
No Drawing. Filed Aug. 8, 1969, Ser. No. 848,713
Claims priority, application Japan, Aug. 13, 1968, 43/57,559
Int. Cl. C07c *149/46*
U.S. Cl. 260—607 B
3 Claims

ABSTRACT OF THE DISCLOSURE 2-propynylsulfonium salts having the formula

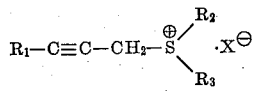

wherein $R_1$ represents hydrogen atom, a straight or branched lower alkyl group, phenyl group or a substituted phenyl group having as a substituent lower alkyl, lower alkoxy, nitro or halogen; $R_2$ and $R_3$ may be the same or different and each represents a straight or branched lower alkyl group; and X represents a halogen atom. The present 2-propynylsulfonium salts exhibit excellent anticoagulant action and thus they can be used in the treatment of thrombophlebitis, phlebothrombosis and other vessel thrombosis and also in the prevention of clotting in surgical procedures. Such 2-propynylsulfonium salts are prepared by reacting a compound having the formula $$R_1-C\equiv C-CH_2-X$$

wherein $R_1$ and X are as defined above with a thioether compound having the formula $$R_2-S-R_3$$

wherein $R_2$ and $R_3$ are as defined above.

---

This invention relates to a new class of 2-propynylsulfonium salts and process for preparing the same.

More particularly, it relates to a 2-propynylsulfonium salt having the formula

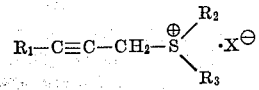

wherein $R_1$ represents hydrogen atom, a straight or branched lower alkyl group, phenyl group or a substituted phenyl group having as a substituent lower alkyl, lower alkoxy, nitro or halogen; $R_2$ and $R_3$ may be the same or different and each represents a straight or branched lower alkyl group; X represents a halogen atom. Also, it relates to a process for the preparation of the 2-propynylsulfonium salt of the above Formula I.

In the above Formula I, with regard to the $R_1$, $R_2$ and $R_3$, illustrative examples of the straight or branched lower alkyl group are methyl, ethyl, n-propyl, isopropyl, n-butyl, isobutyl tert.-butyl or n-pentyl. Illustrative examples of the substituted phenyl group are o-, m- or p-methyl-, -ethyl- or -isopropyl-phenyl; o-, m- or p-methoxy-, -ethoxy- or -isopropoxy-phenyl; o-, m- or p-nitrophenyl; or o-, m- or p-bromo-, -chloro- or -fluoro-phenyl. Illustrative examples of the X group are bromine, chlorine, fluorine or iodine.

The 2-propynylsulfonium salts (I) of this invention are all novel compounds unknown in the prior art and they exhibit excellent anticoagulant action and thus they can be used as an anticoagulant drug for various medical purposes.

Accordingly, it is an object of this invention to provide a new class of the 2-propynylsulfonium salts (I) which are valuable as an anticoagulant drug.

It is another object of this invention to provide a process for the preparation of such useful 2-propynylsulfonium salts (I).

The 2-propynyl sulfonium salts (I) of this invention possess, as explained hereinabove, excellent anticoagulant action and they may be satisfactorily used, for example, in the treatment of thrombophlebitis, phlebothrombosis and other vessel thrombosis and also to prevent clotting before, during, or after surgical procedures.

The present anticoagulant (I) may be given to patients via various administering routes, e.g. parenterally or orally, with preferable oral route. The anticoagulant (I) may be employed in various and conventional unit dosage forms suitable for parenteral or oral administration. Such forms may include powders, pills, tablets, capsules, injectable preparations and the like. Usual single dose of the present anticoagulant (I) for the therapeutic purpose may be within the range of about 25-50 mg. and the maintenance dose is variable. The optimum dose may be determined and selected by those skilled in the art, depending upon the types and severities of disease, the physiological condition, especially prothrombin activity, of patients and the like.

According to this invention, the 2-propynylsulfonium salt (I) is prepared by a process which comprises reacting a compound having the formula $$R_1-C\equiv C-CH_2-X \qquad (II)$$

wherein $R_1$ and X are as defined above with a thioether compound having the formula $$R_2-S-R_3 \qquad (III)$$

wherein $R_2$ and $R_3$ are as defined above.

In carrying out the process of this invention, the reaction may be suitably conducted in the presence or absence of a solvent. Suitable examples of the solvent to be employed include ethers, e.g. diethyl ether and tetrahydrofuran and hydrocarbons, e.g. benzene and toluene. However, there may be satisfactorily employed any of other solvents that do not adversely affect the present reaction. It is preferable in the process to conduct the reaction under anhydrous condition as far as possible, since there may be attained higher yield and purity of the desired product (I). The reaction temperature is not critical in this process, but it is usual and preferable to conduct the reaction at room temperature. The reaction period is usually within the range of about 5 hours to about 10 days.

After completion of the reaction, the desired product may be easily recovered from the reaction mixture by any conventional means. For instance, the desired product which precipitates in situ may be recovered by filtration and, if necessary, further purified by a recrystallization technique.

The following examples are given for the purpose of illustrating of this invention, but they are not intended to limit the scope thereof.

EXAMPLE 1

Preparation of dimethyl 3-phenyl-2-propynylsulfonium bromide

A solution of 19.5 g. of phenylpropargyl bromide and 7.0 g. of methyl sulfide in 30 ml. of anhydrous benzene was stirred at room temperature for 8 hours. At the end of this time, the crystalline substance which precipitated from the reaction mixture was recovered by filtration and recrystallized from ethanol to give 20 g. of the pure form of the desired product as colorless needles melting at 139–141° C.

EXAMPLE 2

Preparation of dimethyl 2-butynylsulfonium bromide

A mixture of 13.3 g. of 2-butynyl bromide and 13.0 g. of dimethyl sulfide was stirred at room temperature for 24 hours, whereby the whole mixture solidified. The reaction mixture was triturated with a small amount of ether and then filtered by means of suction. The crystalline substance thus separated was recrystallized from ethanol to give 18 g. of the pure form of the desired product as colorless leaflets melting at 140–143° C.

EXAMPLE 3

Preparation of dimethyl 2-propynylsulfonium bromide

A solution of 24 g. of propynyl bromide and 12.5 g. of dimethyl sulfide in 60 ml. of anhydrous benzene was stirred at room temperature for 24 hours. At the end of this time, the crystalline substance which precipitated from the reaction mixture was recovered by filtration and recrystallized from ethanol to give 7.5 g. of the pure form of the desired product as colorless prisms melting at 95–98° C. (with decomposition).

EXAMPLE 4

Preparation of dimethyl 3-(p-nitrophenyl)-2-propynylsulfonium bromide

A solution of 1.4 g. of 3-(p-nitrophenyl)-2-propynyl bromide in 10 ml. of anhydrous benzene was stirred at room temperature for 48 hours. At the end of this time, the crystalline substance which precipitated from the reaction mixture was recovered by filtration. The filtrate was concentrated, thereby to precipitate an additional amount of crystalline substance, which was then recovered by filtration. The combined crystalline substances were recrystallized from ethanol to give 0.9 g. of the pure form of the desired product as pale brown leaflets melting at 131–134° C.

EXAMPLE 5

Preparation of methyl isopropyl 3-phenyl-2-propynylsulfonium bromide

A mixture of 3.7 g. of 3-phenyl-2-propynyl bromide and 3.3 g. of methyl isopropyl sulfide was stirred at room temperature for 24 hours, whereby the whole mixture solidified. The solid reaction mixture was immersed in anhydrous ether and the ether was removed by decantation. Thereafter, such immersion and decantation procedure was repeated three times. The resulting crystalline substance was dried in vacuum and then recrystallized from a mixture of ethanol and ether to give 3.7 g. of the pure form of the desired product as colorless needles melting at 119–120° C.

EXAMPLE 6

Preparation of dimethyl 3-(p-bromophenyl)-2-propynylsulfonium bromide

A mixture of 2.74 g. of 3-(p-bromophenyl)-2-propynyl bromide and 1.3 g. of dimethyl sulfide was stirred at room temperature for 30 hours, whereby the whole mixture solidified. The reaction mixture was triturated with a small amount of the ether and then filtered by means of suction. The crystalline substance thus separated was recrystallized from ethanol to give 3 g. of the pure form of the desired product as colorless crystals melting at 161–162° C.

EXAMPLE 7

Preparation of dimethyl 3-(p-methoxyphenyl)-2-propynylsulfonium bromide

A mixture of 4.5 g. of 3-(p-methoxyphenyl)-2-propynyl bromide and 3 g. of dimethyl sulfide was stirred at room temperature for 24 hours, whereby the whole mixture solidified. The reaction mixture was triturated with a small amount of ether and then filtered by means of suction. The crystalline substance thus separated was recrystallized from ethanol to give 5.0 g. of the pure form of the desired product as colorless crystalls melting at 123–125° C.

EXAMPLE 8

Preparation of dimethyl 3-(p-tolyl)-2-propynylsulfonium bromide

A mixture of 2.0 g. of 3-(p-tolyl)-2-propynyl bromide and 4.0 g. of dimethyl sulfide was allowed to stand at room temperature for 24 hours, whereupon crystalline substance precipitated in situ. The crystalline substance was recovered by filtration and recrystallized from ethanol to give 1.24 g. of the desired product as white needles melting at 114–119° C.

EXAMPLE 9

Preparation of dimethyl 3-phenyl-2-propynylsulfonium chloride

A mixture of 5.0 g. of 3-phenyl-2-propynyl chloride and 10.0 g. of dimethyl sulfide was allowed to stand at room temperature for one week, whereupon crystalline substance precipitated in situ. The crystalline substance was recovered by filtration and recrystallized from ethanol to give 5.0 g. of the desired product as white needles melting at 126–128° C.

EXAMPLE 10

Preparation of dimethyl 2-hexynylsulfonium bromide

A mixture of 7.0 g. of 2-hexynyl bromide and 14.0 g. of dimethylsulfide was allowed to stand at room temperature for 20 hours, whereupon crystalline substance precipitated in situ. The crystalline substance was recovered by filtration, washed with ether and then recrystallized from ethanol to give 4.4 g. of the desired product as white needles melting at 59–61° C.

Following the same procedure as described above except that there was employed 4-methyl-2-pentynyl bromide instead of the 2-hexynyl bromide, there was similarly obtained dimethyl 4-methyl-2-pentynyl sulfonium bromide.

What is claimed is:

1. A compound having the formula $$R_1-C{\equiv}C-CH_2-\overset{\oplus}{S}{\diagdown}^{R_2}_{R_3} \cdot X^{\ominus}$$

wherein $R_1$ represents hydrogen atom, a straight or branched lower alkyl group, phenyl group or a substituted phenyl group having as a substituent lower alkyl, lower alkoxy, nitro or halogen; $R_2$ and $R_3$ may be the same or different and each represents a straight or branched lower alkyl group; and X represents a halogen atom.

2. Dimethyl 3-phenyl-2-propynylsulfonium bromide.
3. Dimethyl 3-(p-tolyl)-2-propynylsulfonium bromide.

References Cited

UNITED STATES PATENTS 3,409,660    11/1968    Lloyd _____ 260—607 B X

OTHER REFERENCES

Houben-Weyl "Met. der Org. Chemie," vol. 9 (1955), pp. 175–178.

JOSEPH REBOLD, Primary Examiner

D. R. PHILLIPS, Assistant Examiner

U.S. Cl. X.R.

424—335